(12) United States Patent
Little

(10) Patent No.: US 11,973,891 B2
(45) Date of Patent: *Apr. 30, 2024

(54) HANDS-FREE HOLDING DEVICE FOR ELECTRONIC DEVICE HAVING VIDEO-CONFERENCING DISPLAY

(71) Applicant: WaceTalk LLC, Queens, NY (US)

(72) Inventor: Darin Little, Queens, NY (US)

(73) Assignee: Darin Little, Queens, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/945,505

(22) Filed: Sep. 15, 2022

(65) Prior Publication Data
US 2023/0015061 A1    Jan. 19, 2023

Related U.S. Application Data

(63) Continuation of application No. 17/320,509, filed on May 14, 2021, now Pat. No. 11,477,313.

(60) Provisional application No. 63/038,353, filed on Jun. 12, 2020.

(51) Int. Cl.
*H04M 1/04* (2006.01)
(52) U.S. Cl.
CPC ..................................... *H04M 1/04* (2013.01)
(58) Field of Classification Search
CPC .......... H04M 1/04; H04M 1/06; H04M 1/725; H04B 1/3833; H04B 1/3877; H04B 1/3888
See application file for complete search history.

(56) References Cited

U.S. PATENT DOCUMENTS

| | | | |
|---|---|---|---|
| 7,110,802 B1* | 9/2006 | Kim | H04B 1/3888 455/90.3 |
| 2004/0013265 A1* | 1/2004 | Wang | H04M 1/04 379/441 |
| 2010/0304758 A1* | 12/2010 | Bury | H04M 1/6083 455/456.1 |
| 2012/0312946 A1 | 12/2012 | Tsou et al. | |
| 2015/0163936 A1 | 6/2015 | Le Gette et al. | |
| 2015/0223590 A1 | 8/2015 | Arias-Tabima | |
| 2016/0312950 A1 | 10/2016 | Bowman | |
| 2017/0013950 A1* | 1/2017 | Rieger | F16M 13/04 |

(Continued)

OTHER PUBLICATIONS

International Search Report and Written Opinion of the International Searching Authority and dated Aug. 16, 2021 received in PCT/US21/32408.

*Primary Examiner* — Nguyen T Vo
(74) *Attorney, Agent, or Firm* — Scully, Scott, Murphy & Presser, P.C.

(57) ABSTRACT

A holding device for an electronic device having a video display. The holding device including: a first part configured to hold the electronic device; and a second part rotatably arranged relative to the first part, the second part arranged to oppose the video display, the second part having a portion configured to fix to a user's clothing. Wherein when the portion of the second part is fixed to the user's clothing, the first part is rotatable relative to the second part between a first position and a second position, a first angle between the first part and the second part in the first position is smaller than a second angle between the first part and the second part in a second position to permit the user to view the video display in a hands-free manner in the second position.

6 Claims, 8 Drawing Sheets

(56) References Cited

U.S. PATENT DOCUMENTS

| | | |
|---|---|---|
| 2017/0163306 A1* | 6/2017 | Armstrong ............ H04B 1/3888 |
| 2017/0174146 A1 | 6/2017 | Kipp et al. |
| 2019/0052297 A1 | 2/2019 | Lee |
| 2020/0344344 A1 | 10/2020 | Friedel |
| 2021/0286402 A1* | 9/2021 | DiMeglio ................ G06F 1/163 |
| 2021/0373602 A1 | 12/2021 | Min |
| 2022/0110306 A1* | 4/2022 | Ottomanelli ............ A01K 97/10 |

* cited by examiner

HANDS-FREE HOLDING DEVICE FOR ELECTRONIC DEVICE HAVING VIDEO-CONFERENCING DISPLAY

CROSS-REFERENCE TO RELATED APPLICATION

This application is a continuation of U.S. Ser. No. 17/320,509, filed on May 14, 2021, which claims the benefit of priority to U.S. Provisional Application No. 63/038,353, filed on Jun. 12, 2020, the entire contents of each of which are incorporated herein by reference.

BACKGROUND

Field

The present disclosure relates generally to holding devices, and, in particular, relates to a hands-free holding device for electronic devices having a video display.

Prior Art

Holding devices for electronic devices, such as cell phones are well known in the art. For example, such holding devices include cell phone cases that may include a stand for holding the cell phone on a surface, such as a tabletop, such that the cell phone's display can be viewed by a user. Further holding devices may hold a cell phone or tablet on a stand, such that the device's display can be viewed by a user.

However, such holding devices are only usable when the user is stationary. When the user is moving, such as walking, users must hold the device in one or more hands to view the device's display. Therefore, the user cannot perform other tasks with both hands while viewing the display and while moving. Furthermore, the user may not have full use of his/her hands, due to injury or disability and are unable to hold the device at all or for any appreciable period of time.

Therefore, there is a need in the art for a holding deice for personal electronic devices having a display which hallow a user to view the display in a hands-free manner while moving, such as walking or jogging.

SUMMARY

Accordingly, a holding device for an electronic device having a video display is provided. The holding device comprising: a first part configured to hold the electronic device; and a second part rotatably arranged relative to the first part, the second part arranged to oppose the video display, the second part having a portion configured to fix to a user's clothing; wherein when the portion of the second part is fixed to the user's clothing, the first part is rotatable relative to the second part between a first position and a second position, a first angle between the first part and the second part in the first position is smaller than a second angle between the first part and the second part in a second position to permit the user to view the video display in a hands-free manner in the second position.

The first part can include a concavity configured to hold the electronic device within the concavity, wherein the concavity having a first opening corresponding to the video display of the electronic device. The first part can include one or more second openings corresponding to one or more of buttons, speakers and cameras of the electronic device.

The portion of the second part can be a clip having a u-shape.

The first part and the second part can be rotatably arranged relative to each other by a shaft arranged in first and second holes provided in the first and second parts, respectively.

The holding device can further comprise a spring for biasing the first and second parts towards the first position.

The first angle between the first part and the second part in the first position can be 0 degrees.

The holding device can further comprise a first rod connecting the shaft to the first part. The first rod can include two rods rotatable relative to each other about a longitudinal axis of the first rod. The holding device can further comprise a second rod disposed between the first rod and the first part. The first rod is rotatable can be a first plane relative to the shaft, the two rods can be rotatable relative to each other in a second plane and the second rod can be rotatable relative to the first part in a third plane, where the first, second and third planes can each be orthogonal to each other.

DETAILED DESCRIPTION

Figure 1:
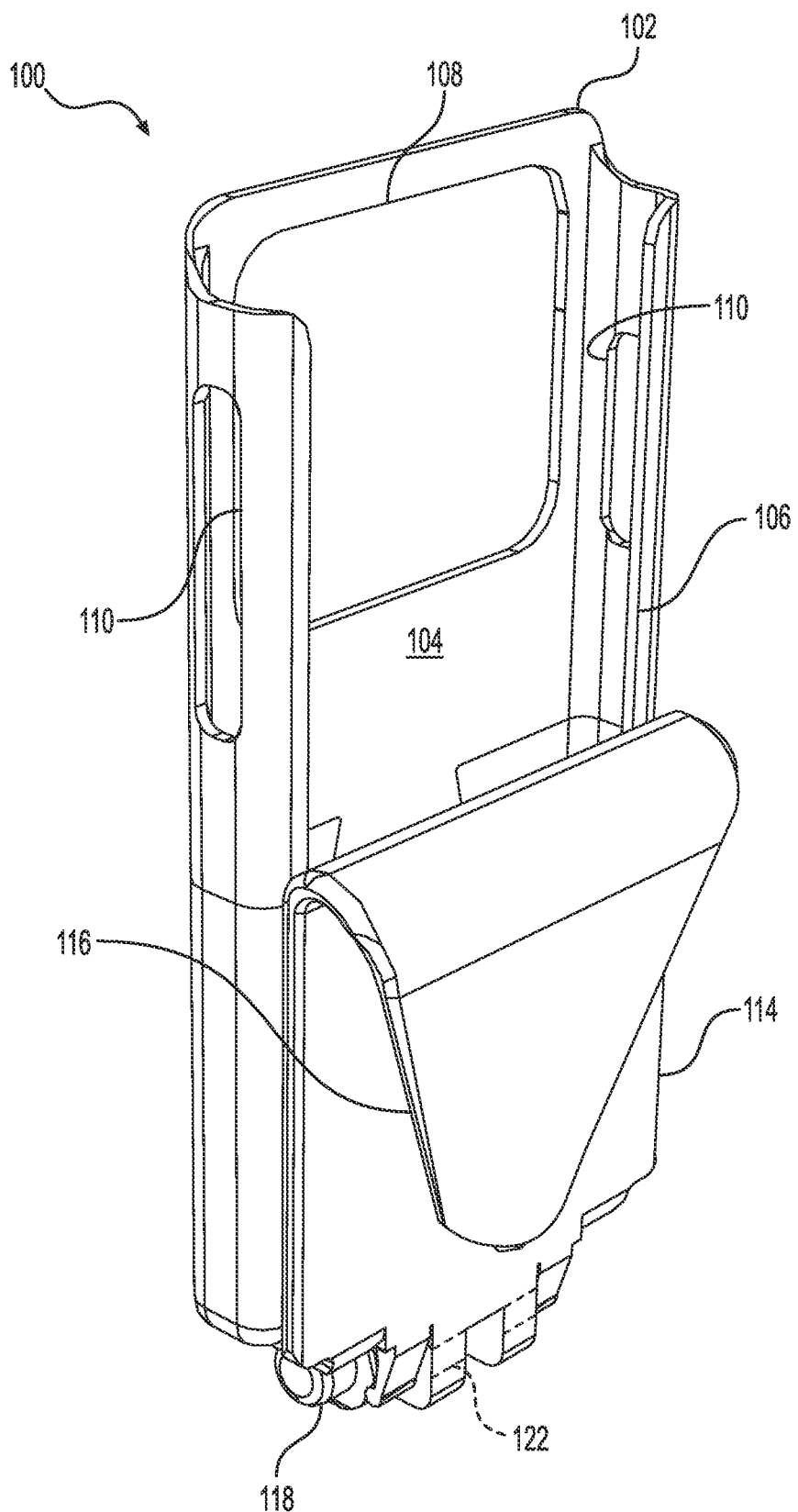
FIG. 1 illustrates isometric view of a first embodiment of holding device in a first (closed) position.
Figure 2:
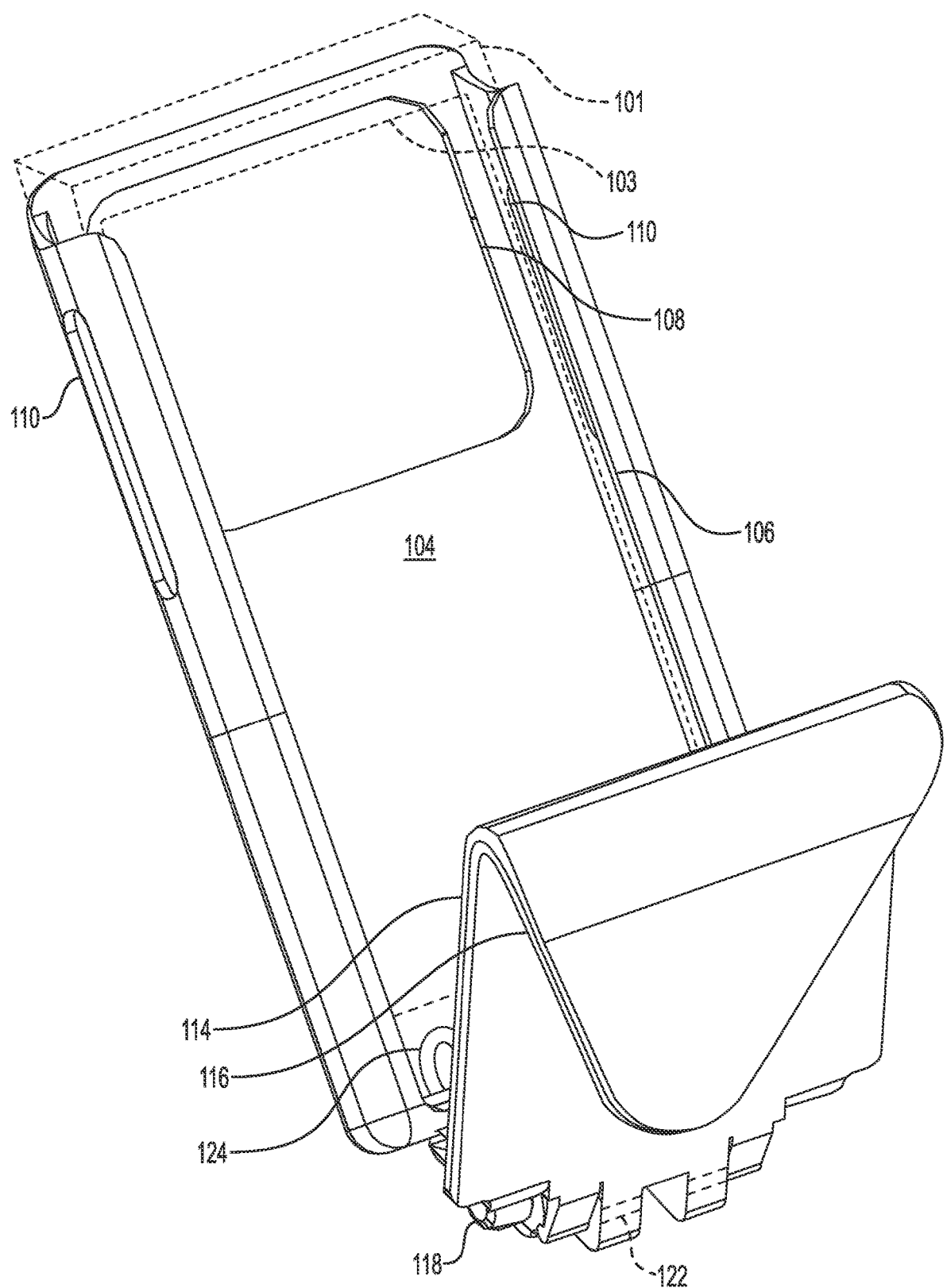
FIG. 2 illustrates the holding device of FIG. 1 with the holding device in a second (open) position.

Referring now to FIGS. 1 and 2, FIG. 1 illustrates an isometric view of a first embodiment of holding device 100 in a first (closed) position while FIG. 2 illustrates the holding device 100 of FIG. 1 with the holding device in a second (open) position.

The holding device 100 is configured to hold an electronic device having a video display, such as a cell phone also known as a smart phone. For example, such video-display being capable of video-conferencing with another party. The holding device 100 has a first part 102 configured to hold the electronic device, as such, the first part 102 can have a shape and configuration similar to a well-known cell phone case having a pocket or concavity 104 configured to hold the electronic device 101 (shown in phantom lines in FIG. 2) within the concavity 104. The concavity having a first opening 106 corresponding to the video display 103 (also shown in phantom line in FIG. 2) of the electronic device 101. The first part 102 can further have one or more second openings 108, 110, 112 corresponding to one or more of cameras, buttons and speakers, respectively, of the electronic device.

The first part 102 can be formed of plastic, such as polycarbonate similar to protective cell phone cases known in the art. In such configuration, the first part 102 can be injection molded as is known in the art. The first part 102 can alternatively be made of leather or metal as is known in the art for higher-end cell phone protective cases.

The holding device 100 further includes a second part 114 that is rotatably arranged relative to the first part 102 such that the first part 102 rotates relative to the second part 114 between a first (closed) position shown in FIG. 1 and a second (open) position shown in FIG. 2. As can be seen in FIG. 1, the second part 114 is arranged to oppose the video display of the electronic device. That is, the second part 114 is opposed to the first opening 106 of the first part 102.

Figure 3:
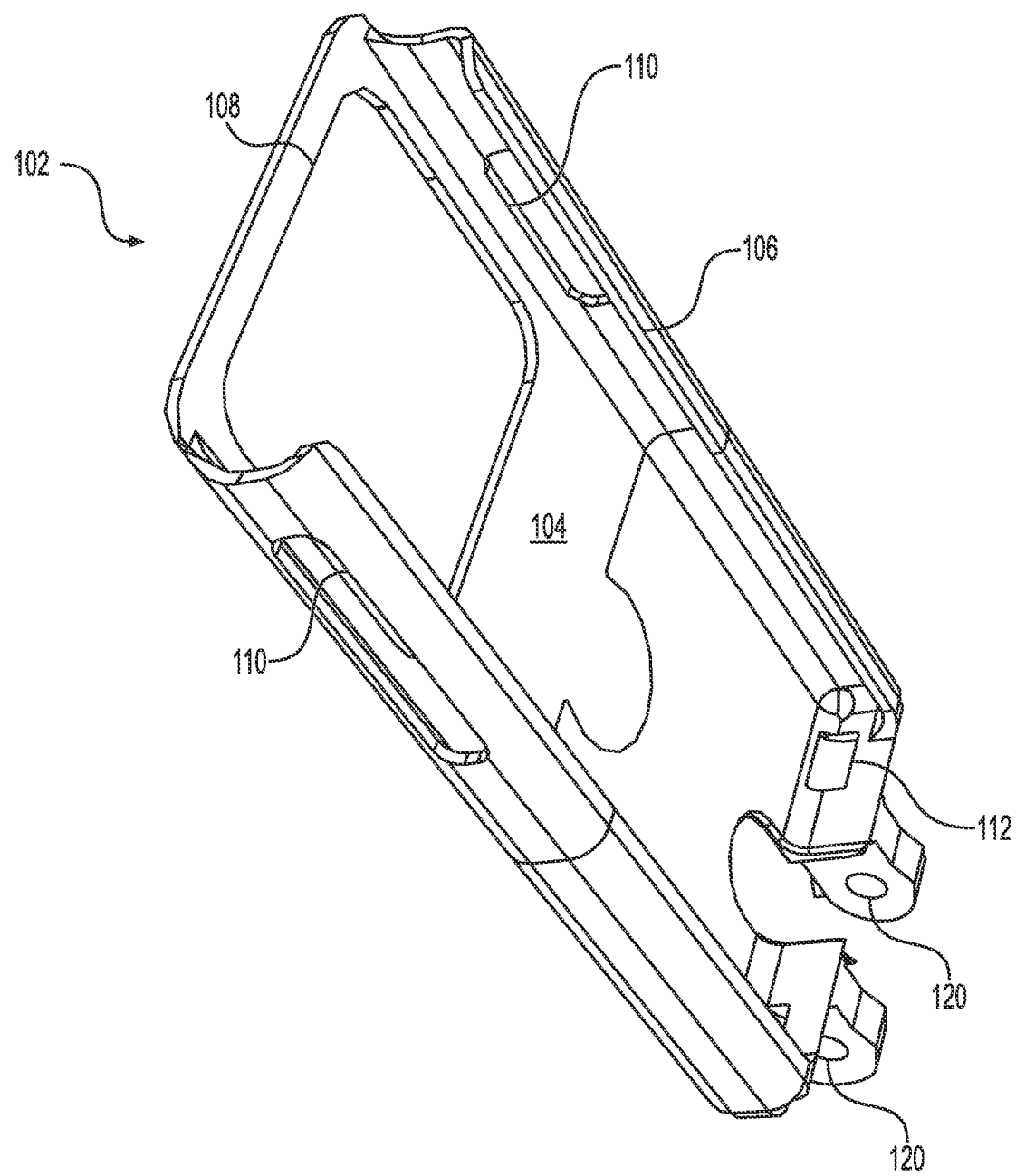
FIG. 3 illustrates a first part of the holding device of FIG. 1 apart from a second part.

As shown in FIGS. 1-3, the second part 114 also includes a portion 116 that is configured to fix to a user's clothing. The portion 116 of the second part 114 can be a clip having a u-shape. Clips for attaching to a user's clothing, such as the user's waistband or belt are well known in the art, typically being formed of a resilient material that can be expanded to fit over the user's clothing and tends to close over the user's clothing to firmly fix the second part 114, and the first part 102 attached thereto, to the user (see FIGS. 7 and 8 below).

Figure 4:
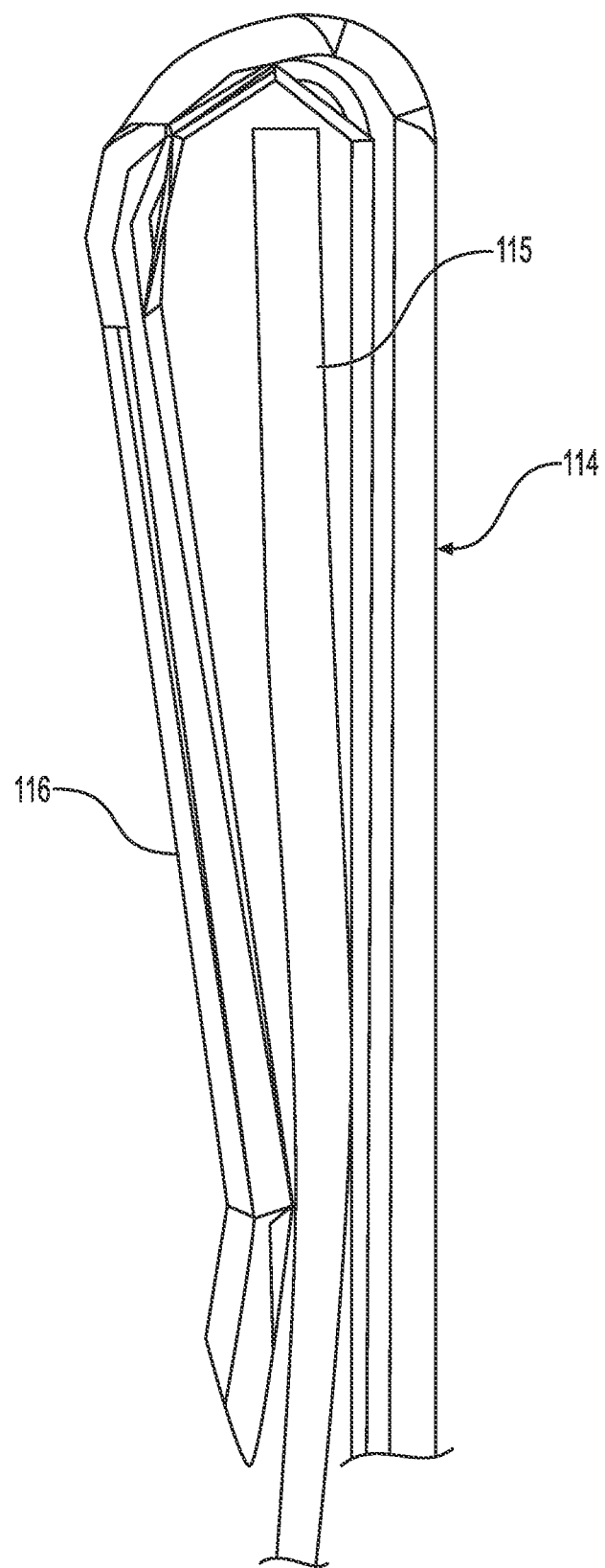
FIG. 4 illustrates a clip portion of the second part of the holding device apart from the first part.
Figure 7:
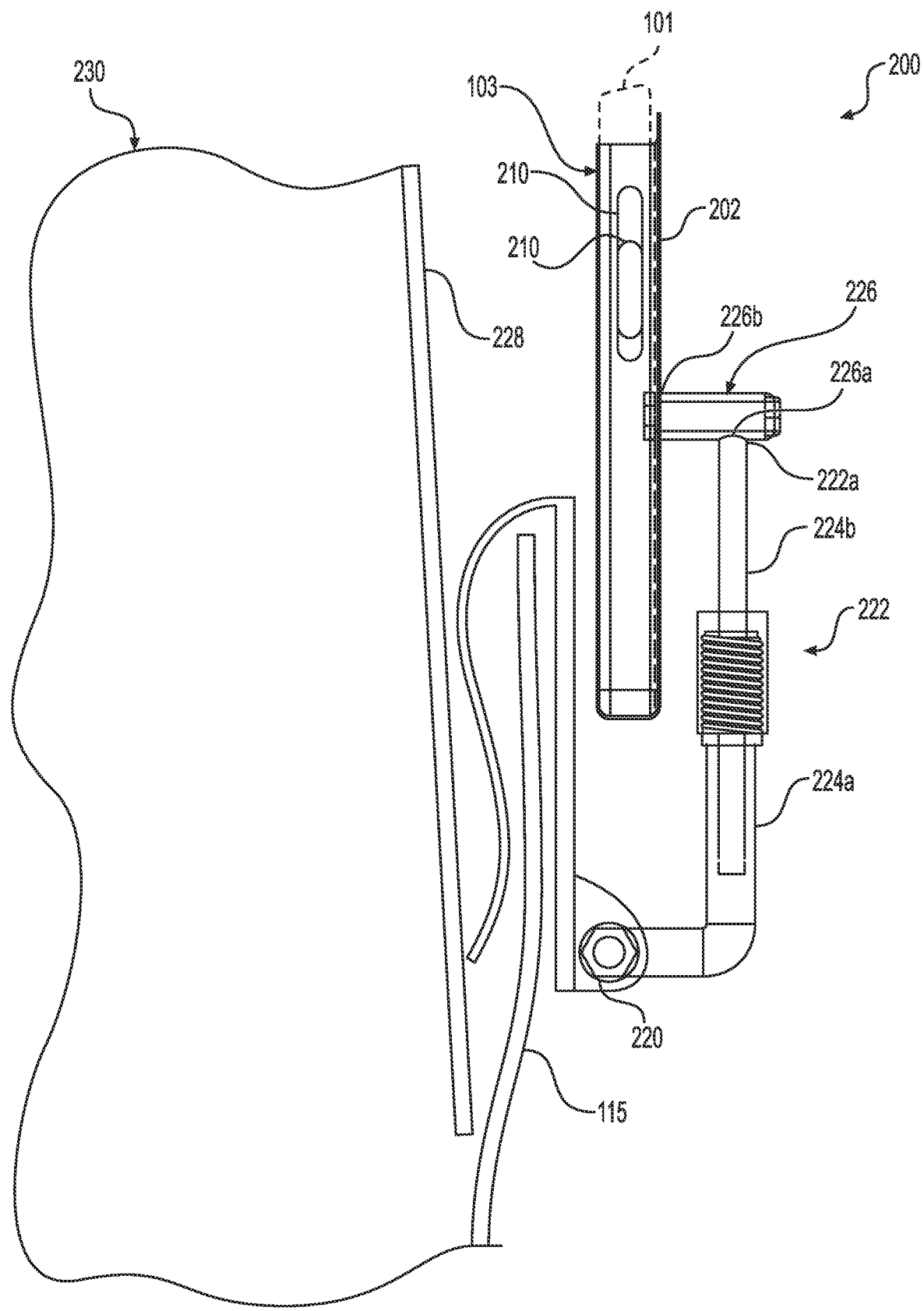
FIG. 7 illustrates the holding device of FIG. 5 attached to a front of a user's clothing where the holding device is in the first (closed) position.
Figure 8:
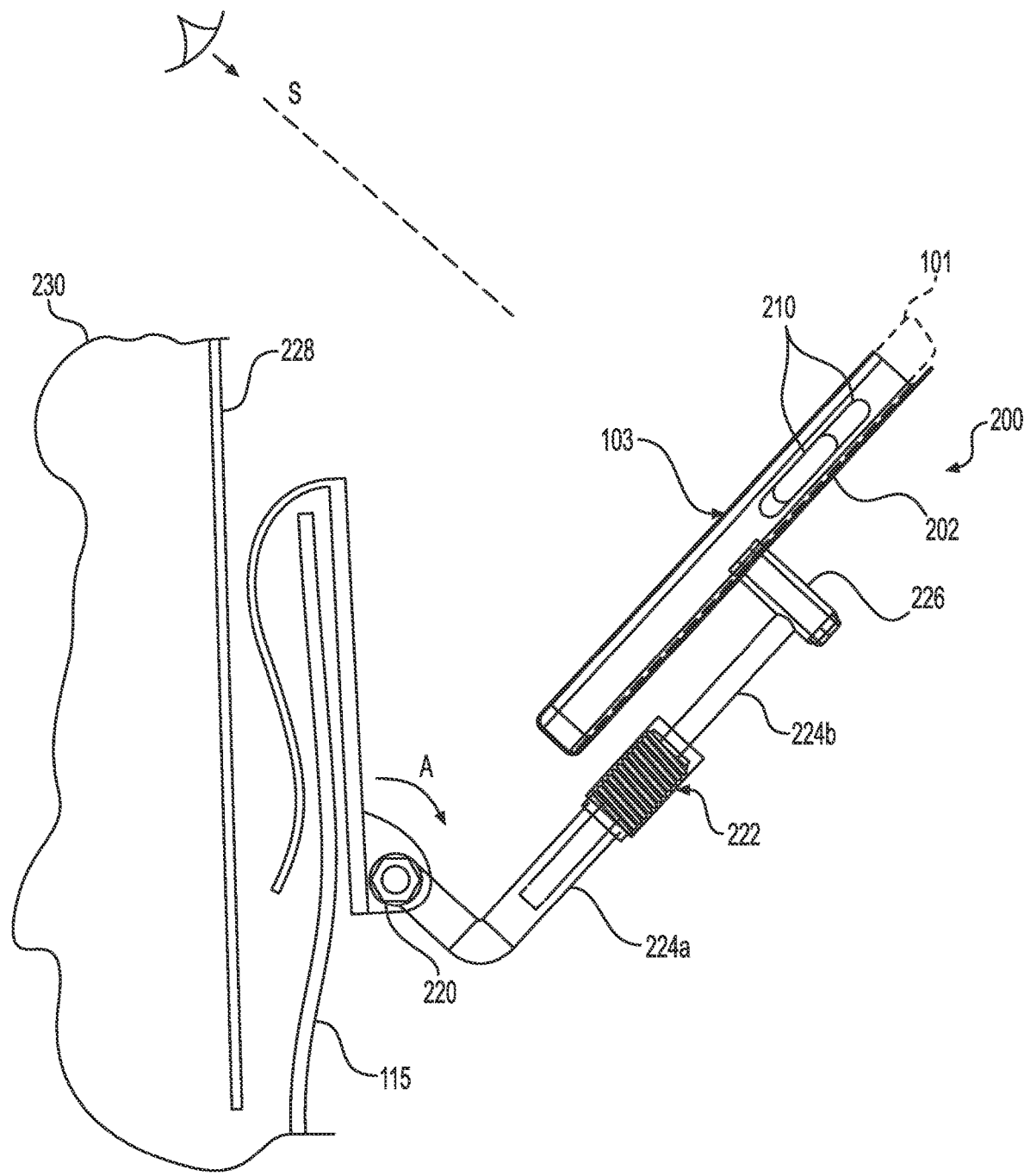
FIG. 8 illustrates the holding device of FIG. 7 attached to the front of the user's clothing where the holding device is in the second (open) position.

As so configured, when the portion 116 of the second part 114 is fixed to the user's clothing 115 (see FIG. 4), the first part 102 is rotatable relative to the second part 114 between the first (closed) position as shown in FIG. 1 and a second (open) position shown in FIG. 2 such that a first angle between the first part and the second part in the first position is smaller than a second angle between the first part and the second part in a second position to permit the user to view the video display 103 of the electronic device 101 in a hands-free manner in the second (open) position (see FIGS. 7 and 8 below).

The second part 114 can also be formed of plastic, such as polycarbonate or metal or leather and may be formed separately or integrally with the portion (clip) 116, where at least the portion 116 is formed of a resilient material capable of elastically deforming to securely fix the holding device 100 to the user's clothing, such as the user's waistband or belt.

As discussed above, the first part 102 and the second part 114 are rotatably arranged relative to each other, such as by a shaft 118 arranged in first holes 120 on the first part 102 and corresponding second holes 122 (shown in phantom lines in FIG. 1) provided in the second part 114. A biasing member, such as a torsional spring 124 may be provided for biasing the first part 102 and the second part 114 towards the first position. Furthermore, such biasing may be disengaged when the first part 102 and the second part 114 are in the second (open) position and only engaged when the first part 102 is moved towards the first (closed) position.

The first angle between the first part and the second part in the first position can be substantially 0 degrees. That is, when in the first position, the first and second parts 102, 114 can be substantially parallel to each other and may also be in contact with each other (other than at the shaft 118). The angle between the first and second parts 102, 114 in the second position can be any angle where the display 103 can be comfortably viewed by the user, such as at 45 degrees. Furthermore, such angle may be variable where the first and second parts 102, 114 can take any number of predetermined second positions, such as by using well known resilient projections on one of the first and second parts 102, 114 and mating depressions on the other of the first and second parts 102, 114 where such resilient projections and mating depressions are arranged at predetermined intervals, each corresponding to a second position. The angle between the first and second parts 102, 114 may also be infinitely variable relative to each other, for example, by using a well-known frictional resistance between mating surfaces of the first and second parts 102, 114.

Figure 5:
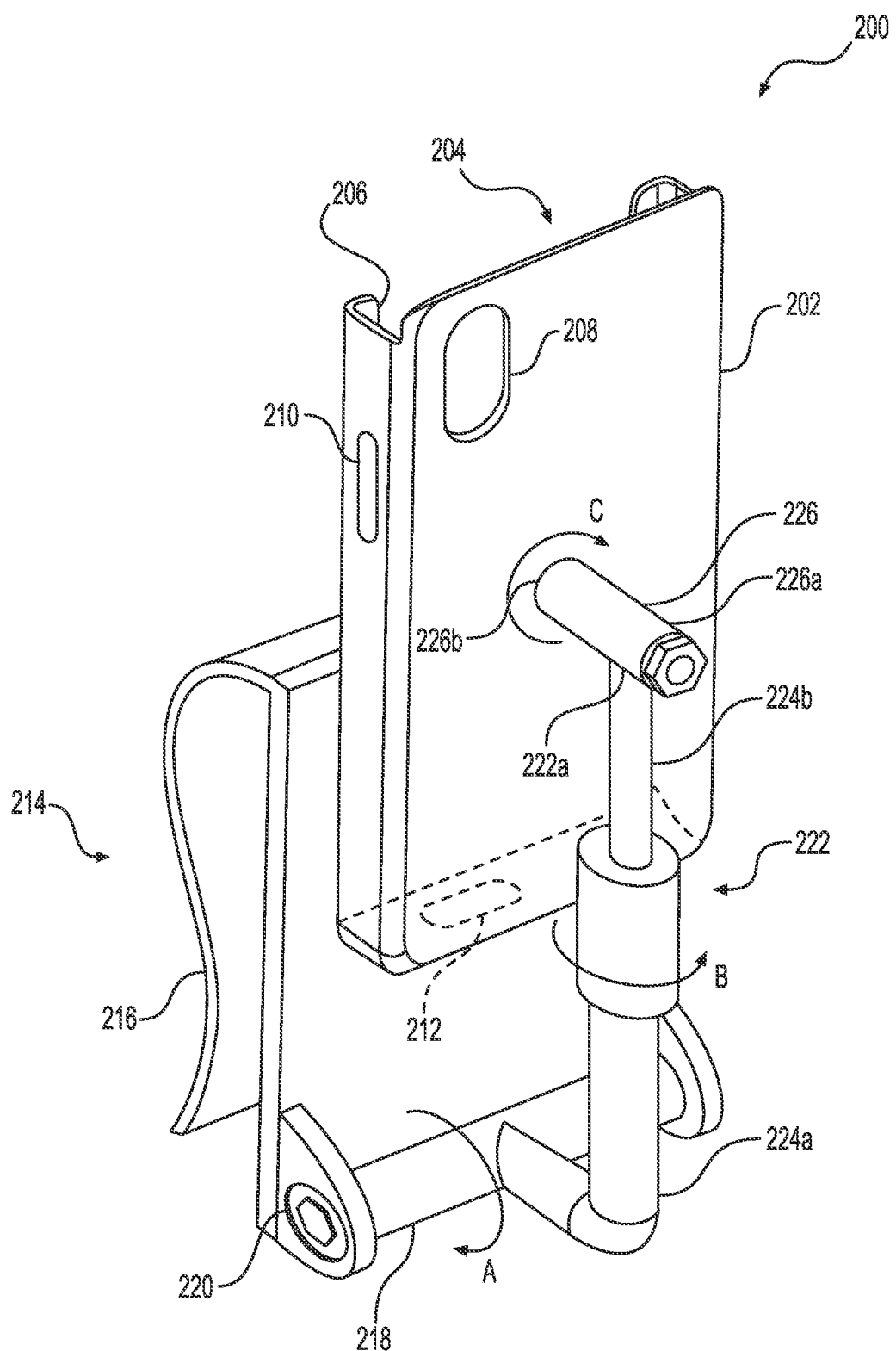
FIG. 5 illustrates an isometric view of a second embodiment of holding device in the first (closed) position.
Figure 6:
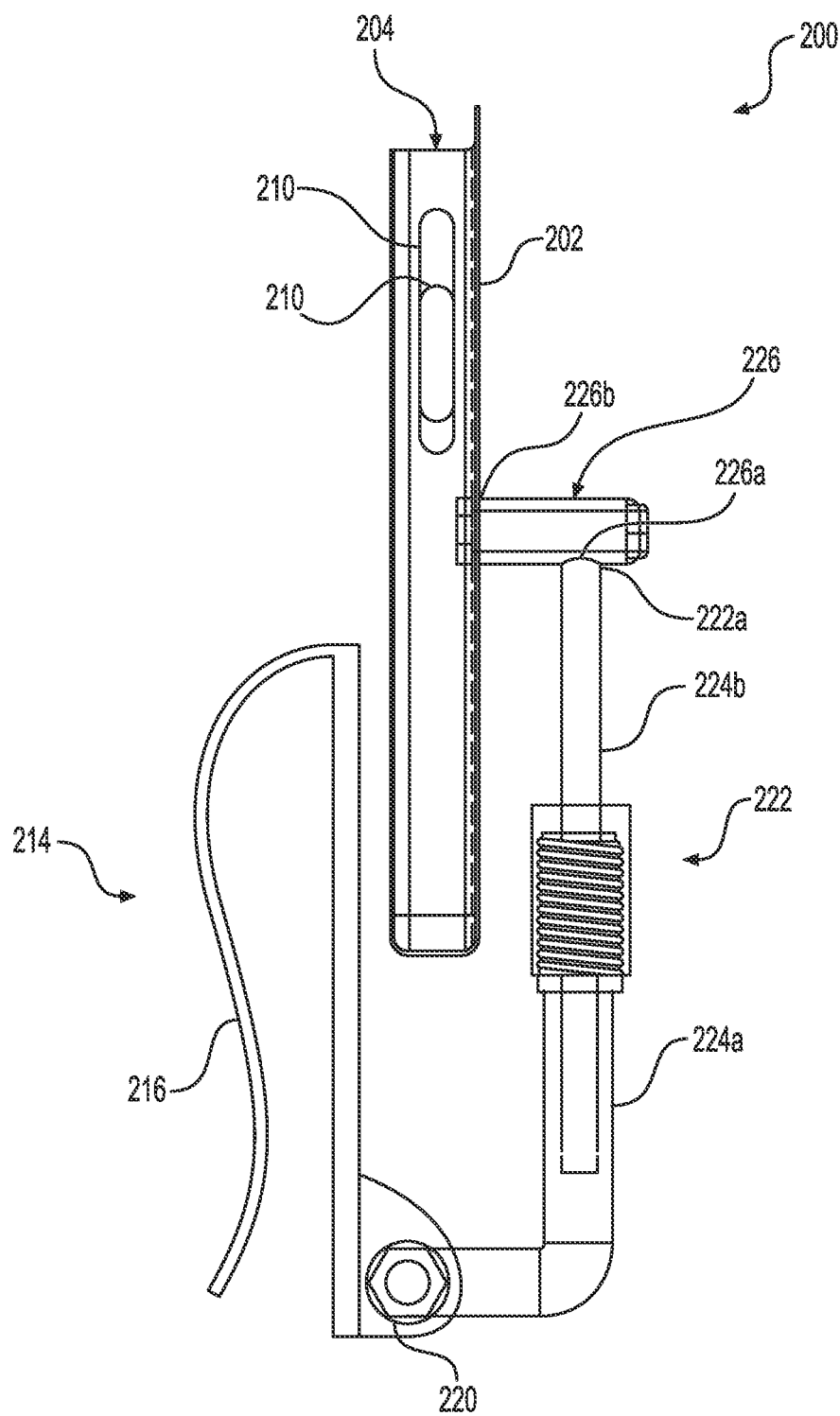
FIG. 6 illustrates a side view of the holding device of FIG. 5.

Referring now to FIGS. 5 and 6, an isometric view of a second embodiment of holding device 200 is shown, where FIG. 5 illustrates the holding device 200 in the first (closed) position and FIG. 6 illustrates a side view of the holding device 200 of FIG. 5.

The holding device 200 is configured to hold the electronic device having the video display. The holding device 200 has a first part 202 configured to hold the electronic device, as such, the first part 202 can have a shape and configuration similar to that discussed above with regard to FIG. 1, such as having a pocket or concavity 204 configured to hold the electronic device within the concavity. The concavity having a first opening 206 corresponding to the video display of the electronic device. As discussed above with regard to the first embodiment of holding device, the first part 202 can further have one or more second openings 208, 210, 212 corresponding to one or more of cameras, buttons and speakers, respectively, of the electronic device.

The first part 202 can be formed of plastic, such as polycarbonate similar to protective cell phone cases known in the art. In such configuration, the first part 202 can be injection molded as is known in the art. The first part 202 can alternatively be made of leather or metal as is known in the art for higher-end cell phone protective cases.

The holding device 200 further includes a second part 214 that is rotatably arranged relative to the first part 202 such that the first part 102 rotates relative to the second part 214 between a first (closed) position shown in FIG. 7 and a second (open) position shown in FIG. 8. As can be seen in FIGS. 5 and 7, the second part 214 is arranged to oppose the video display of the electronic device. That is, the second part 214 is opposed to the first opening 206 of the first part 202.

As shown in FIGS. 5 and 6, the second part 214 also includes a portion 216 that is configured to fix to a user's clothing. The portion 216 of the second part 214 can be configured as discussed above with regard to the first embodiment of holding device, such as being a clip having a u-shape. As discussed above, such clips for attaching to a user's clothing are well known in the art.

As so configured, when the portion 216 of the second part 214 is fixed to the user's clothing 115 (see FIGS. 7 and 8), the first part 202 is rotatable relative to the second part 214 between the first (closed) position as shown in FIG. 7 and a second (open) position shown in FIG. 8 such that a first angle between the first part 202 and the second part 214 in the first position is smaller than a second angle between the first part 202 and the second part 214 in a second position to permit the user to view the video display 103 of the electronic device 101 along the user's line of sight S in a hands-free manner in the second (open) position (see FIGS. 7 and 8 below).

The second part 214 can also be formed of plastic, such as polycarbonate or metal or leather and may be formed separately or integrally with the portion (clip) 216, where at least the portion 216 is formed of a resilient material capable of elastically deforming to securely fix the holding device 200 to the user's clothing, such as the user's waistband or belt.

As discussed above, the first part 202 and the second part 214 are rotatably arranged relative to each other about rotation plane A, such as by a shaft 218 arranged in first holes 220 on the first part 202. Although not shown in the second embodiment, as discussed above with regard to the first embodiment of holding device, a biasing member, such as a torsional spring may be provided for biasing the first part 202 and the second part 214 towards the first position. Furthermore, such biasing may be disengaged when the first part 202 and the second part 214 are in the second (open) position and only engaged when the first part 202 is moved towards the first (closed) position.

In the second embodiment of holding device 200, the first and second parts 202, 214 are connected by a first rod 222 and second rod 226. The first rod 222 may be fastened to the shaft 218 by any means known in the art or may be integrally formed therewith. The first rod 222 can include two sub-rods 224a, 224b which rotate relative to each other along a longitudinal axis of the first rod 222 about rotation plane B. Such two rods 224a, 224b can rotate relative to each other by any means known in the art, such as by mating threads on each of the two rods 224a, 224b or a retaining ring on one of the two rods 224a, 224b that is captured in a mating slot in the other of the two rods 224a, 224b. The second rod 226 connects an end 222a of the first rod 222 to a portion 226a of the second rod 226. An end 226b of the second rod 226 is connected to first part 202 by any means known in the art, such as by a screwed fastener and may also be integrally formed with the first part 202. Such connection between the first part 202 and the second rod 226 may be rotatable such that the first part 202 and second rod 226 rotate relative to each other about rotation plane C.

As configured to rotate in one or more of the rotations planes A, B and C discussed above, the first rod 222 is rotatable in the first plane A relative to the shaft 218 to rotate the first part 202 relative to the second part 214 between the first (open) and second (closed) positions, the two rods 224a, 224b are rotatable relative to each other in the second plane B to swivel the first part 202 relative to the second part 214 to change an orientation of the display device of the electronic device accordingly and the second rod 226 is rotatable relative to the first part 202 in the third plane C to change between landscape and portrait orientations of the display device of the electronic device as viewed along the user's sight line S (see FIG. 8). As shown in FIG. 5, the first, second and third planes A, B, C can each be orthogonal to each other.

Referring now to FIGS. 7 and 8, the same illustrate the holding device of FIG. 5 attached to a front side 228 of a user's 230 clothing 115 (such as near a lower abdomen of the user 230) where the holding device 200 is in the first (closed) position in FIG. 7 and where the holding device 200 is in the second (open) position in FIG. 8. As shown in FIG. 8, as oriented, the second holding device 200 allows the video display 103 of the electronic device 101 to be viewed along the user's line of sight S when the holding device 200 is in the second (open) position) in a hands-free manner.

As discussed above with regard to the first embodiment, the first angle between the first part 202 and the second part 214 in the first (closed) position can be substantially 0 degrees. That is, when in the first position, the first and second parts 202, 214 can be substantially parallel to each other and may also be in contact with each other (other than at the shaft 218). The angle between the first and second parts 202, 214 in the second position can be any angle where the display 103 can be comfortably viewed by the user, such as at 45 degrees. Furthermore, such angle may be variable where the first and second parts 202, 214 can take any number of predetermined second (open) positions, such as by using well known resilient projections on one of the first and second parts 102, 114 and mating depressions on the other of the first and second parts 102, 114 where such resilient projections and mating depressions are arranged at predetermined intervals, each corresponding to a second position. The angle between the first and second parts 202, 214 may also be infinitely variable relative to each other, for example, by using a well-known frictional resistance between mating surfaces of the first and second parts 202, 214.

Although shown with regard to the second embodiment of the holding device 200, the holding device 100 of the first embodiment is similarly oriented as shown in FIGS. 7 and 8.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A holding device for an electronic device having a video display, the holding device comprising:
a first part configured to hold the electronic device; and
a second part rotatably arranged relative to the first part, the second part arranged to oppose the video display, the second part having a portion configured to fix to a user's clothing at a single position on the user's clothing;
wherein when the portion of the second part is fixed to the user's clothing, the first part is rotatable relative to the second part between a first position and a second position, a first angle between the first part and the second part in the first position is smaller than a second angle between the first part and the second part in a second position to permit the user to view the video display in a hands-free manner in the second position;
the first part and the second part are rotatably arranged relative to each other by a shaft arranged in first and second holes provided in the first and second parts, respectively;
further comprising a first rod connecting the shaft to the first part; and
the first rod includes two rods rotatable relative to each other about a longitudinal axis of the first rod.

2. The holding device of claim 1, further comprising a second rod disposed between the first rod and the first part.

3. The holding device of claim 2, wherein the first rod is rotatable in a first plane relative to the shaft, the two rods are rotatable relative to each other in a second plane and the second rod is rotatable relative to the first part in a third plane, where the first, second and third planes are each orthogonal to each other.

4. The holding device of claim 1, wherein the portion of the second part is a clip having a u-shape, the clip having an open end and a closed end, the closed end being closer to a free end of the second part than to the shaft.

5. A holding device for an electronic device having a video display, the holding device comprising:
a first part configured to hold the electronic device; and
a second part rotatably arranged relative to the first part, the second part arranged to oppose the video display, the second part having a portion configured to fix to a user's clothing at a single position on the user's clothing;
wherein the first part is movable relative to the second part in three degrees of freedom;

the first part and the second part are rotatably arranged relative to each other by a shaft arranged in first and second holes provided in the first and second parts, respectively; and further comprising a first rod connecting the shaft to the first part; and the first rod includes two rods rotatable relative to each other about a longitudinal axis of the first rod.

6. The holding device of claim 5, further comprising a second rod disposed between the first rod and the first part;

wherein the three degrees of freedom comprises the first rod is rotatable in a first plane relative to the shaft, the two rods are rotatable relative to each other in a second plane and the second rod is rotatable relative to the first part in a third plane, where the first, second and third planes are each orthogonal to each other.

* * * * *